(12) United States Patent
Song et al.

(10) Patent No.: US 6,307,736 B1
(45) Date of Patent: Oct. 23, 2001

(54) PORTABLE COMPUTER WITH VERTICALLY POSITIONABLE KEYBOARD

(75) Inventors: Sung-Ming Song; Ping-Huang Kuo, both of Taipei (TW)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/570,968

(22) Filed: May 15, 2000

Related U.S. Application Data

(63) Continuation of application No. 08/998,916, filed on Dec. 29, 1997, now Pat. No. 6,064,564.

(51) Int. Cl.$^7$ .............................. G06F 1/16; B41J 11/58
(52) U.S. Cl. ...................... 361/680; 361/679; 400/682; 400/693
(58) Field of Search ..................... 361/679–686, 361/724–727; 400/682, 692, 691, 693, 82

(56) References Cited

U.S. PATENT DOCUMENTS

| | | | |
|---|---|---|---|
| 4,980,676 | 12/1990 | Nomura et al. | 340/700 |
| 5,168,427 | * 12/1992 | Clancy et al. | 361/680 |
| 5,214,574 | * 5/1993 | Chang | 361/680 |
| 5,443,320 | 8/1995 | Agata et al. | 400/715 |
| 5,490,036 | 2/1996 | Lin et al. | 361/680 |
| 5,510,953 | 4/1996 | Merkel | 361/680 |
| 5,526,226 | 6/1996 | Katoh et al. | 361/680 |
| 5,539,615 | * 7/1996 | Sellers | 361/380 |
| 5,546,334 | * 8/1996 | Hsieh et al. | 361/680 |
| 5,555,487 | * 9/1996 | Katoh et al. | 361/680 |
| 5,572,399 | * 11/1996 | Shirato et al. | 361/680 |
| 5,576,929 | * 11/1996 | Uchiyama et al. | 361/680 |
| 5,764,474 | * 6/1998 | Youens | 361/680 |
| 5,825,614 | 10/1998 | Kim | 361/683 |

* cited by examiner

*Primary Examiner*—Leo P. Picard
*Assistant Examiner*—Lisa Lea-Edmonds

(57) ABSTRACT

A portable computer has a base housing to which a display housing is pivotally secured for movement between open and closed orientations. Extending across a top side opening of the base housing is a keyboard assembly which may be removed from the top side of the base housing. The removed keyboard assembly may be vertically supported on a rear portion of the base housing, to permit access to the base housing through its now exposed top side opening, by means of tabs formed on a rear side edge of the keyboard support plate structure and removably insertable in corresponding vertically extending slots in the top side wall of the base housing. This vertical support of the removed keyboard assembly prevents it from being misplaced, reduces the potential for damaging it by laying it aside on an adjacent work space area, holds the vertically supported keyboard assembly away from the display screen to prevent the keyboard assembly from scratching it. Additionally, the vertical support of the removed keyboard assembly may be achieved without disconnecting the ribbon cable that operatively couples the keyboard assembly to the associated electronics within the base housing. When the keyboard assembly is operatively installed on the top side of the base housing, the rear side edge tabs on the support plate are removably received in corresponding horizontal slots in the base housing.

20 Claims, 3 Drawing Sheets

PORTABLE COMPUTER WITH VERTICALLY POSITIONABLE KEYBOARD

This application is a continuation of Ser. No. 08/998,916 filed Dec. 29, 1997 now U.S. Pat. No. 6,064,564.

BACKGROUND OF THE INVENTION

1. Field of the Invention

The present invention generally relates to electronic apparatus and, in a preferred embodiments thereof, more particularly provides a portable computer having on the top side of its base housing a keyboard assembly which may be tilted up to and releasably locked in a generally vertical position to provide access to a portion of the base housing which was previously covered by the keyboard assembly.

2. Description of Related Art

Portable computers, such as the popular "notebook" computer, conventionally comprise a base housing in which various electronic components and circuitry are housed, and a lid or display screen housing which is hingedly secured to a rear edge portion of the base housing for pivotal movement relative thereto between open and closed positions. Mounted on the top side portion of the base housing is a keyboard assembly which may be removed for service and to provide access to the base housing.

Once the keyboard assembly is removed to provide access to the base housing a problem typically arises as to what to do with the removed keyboard until it is operatively reinstalled on the base housing. For example, it can simply be placed in a flat orientation on the work area surface to one side of the computer. This placement of the removed keyboard, however, gives rise to the possibility that it may be misplaced, or damaged by dropping other equipment on it or knocking it off the workspace area and damaging it. Another approach is to lean it up against a side edge or front side portion of the opened display housing. This technique, however, undesirably makes the removed keyboard susceptible to falling over and damaging the keyboard and/or contacting and scratching the display screen.

It can thus be seen from the foregoing that a need exists for a removed keyboard placement technique that eliminates or at least substantially reduces these potential problems. It is to this need that the present invention is directed.

SUMMARY OF THE INVENTION

In carrying out principles of the present invention, in accordance with a preferred embodiment thereof, an electronic device is provided which is representatively a portable notebook computer having a base housing having a top side and a rear side, a display housing secured to a rear portion of the base housing for pivotal movement relative thereto between open and closed positions, and a keyboard assembly representatively having a generally plate-like support structure upon which a series of keys are operatively mounted.

According to a primary aspect of the invention, cooperating means are provided on the base housing and a portion of the keyboard assembly, representatively the support structure, for selectively holding the keyboard assembly on the top side of the base housing in either an operating orientation or in an access orientation.

With the keyboard assembly in its operating orientation, the support structure extends along a portion of the base housing top side in a generally parallel relationship therewith. In the access orientation of the keyboard assembly, and with the display housing opened, the support structure upwardly extends generally transversely from the base housing top side to expose the portion of the base housing top side previously covered by the keyboard assembly, thereby permitting base housing access through such previously covered top side portion. Preferably, the keyboard assembly in its access orientation is positioned on a rear top side portion of the base housing inwardly adjacent the opened display housing.

The keyboard assembly is illustratively coupled to electronic circuitry within the base housing by a flexible ribbon cable interconnected between the keyboard assembly and an electrical connector in the base housing. Conveniently, the keyboard assembly may be moved between its operating and access orientations without having to disconnect the cable from either the keyboard assembly or the electrical connector.

In a preferred embodiment thereof the cooperating means include interlockable tab and slot means on the keyboard assembly and the base housing. These tab and slot means illustratively include rearwardly projecting tabs formed on a rear side edge portion of the keyboard assembly support structure, and horizontally and vertically extending slots formed in the base housing. With the keyboard assembly in its horizontal operating orientation, the support structure tabs are removably received in the horizontal base housing slots, and with the keyboard assembly in its upright access orientation on a rear top side portion of the base housing a pair of the support structure tabs are removably received in a corresponding pair of the vertical slots.

By being able to vertically support the keyboard assembly on the base housing during access thereto, the keyboard assembly cannot become separated from the balance of the computer and lost. Additionally, the removed keyboard assembly does not have to be placed on a work surface area to one side of the computer where the keyboard assembly can be damaged by other equipment or be knocked off onto the floor.

Also, although the removed keyboard assembly is held in a generally vertical orientation on the top side of the base housing it is not necessary that the keyboard assembly be leaned up against the opened lid housing to be supported in this orientation. Accordingly, the vertically supported keyboard assembly does not engage and potentially scratch the display screen carried on the front side of the opened display housing.

The specially designed support structure portion of the keyboard assembly, with its rear side edge tabs, and the associated base housing slots, are quite simple to fabricate, and do not appreciably add to the overall cost of the computer. Also, due to these interlocking tabs and slots means, the keyboard assembly may be quite easily and quickly be moved between its operating and access orientations.

DETAILED DESCRIPTION

Figure 1:
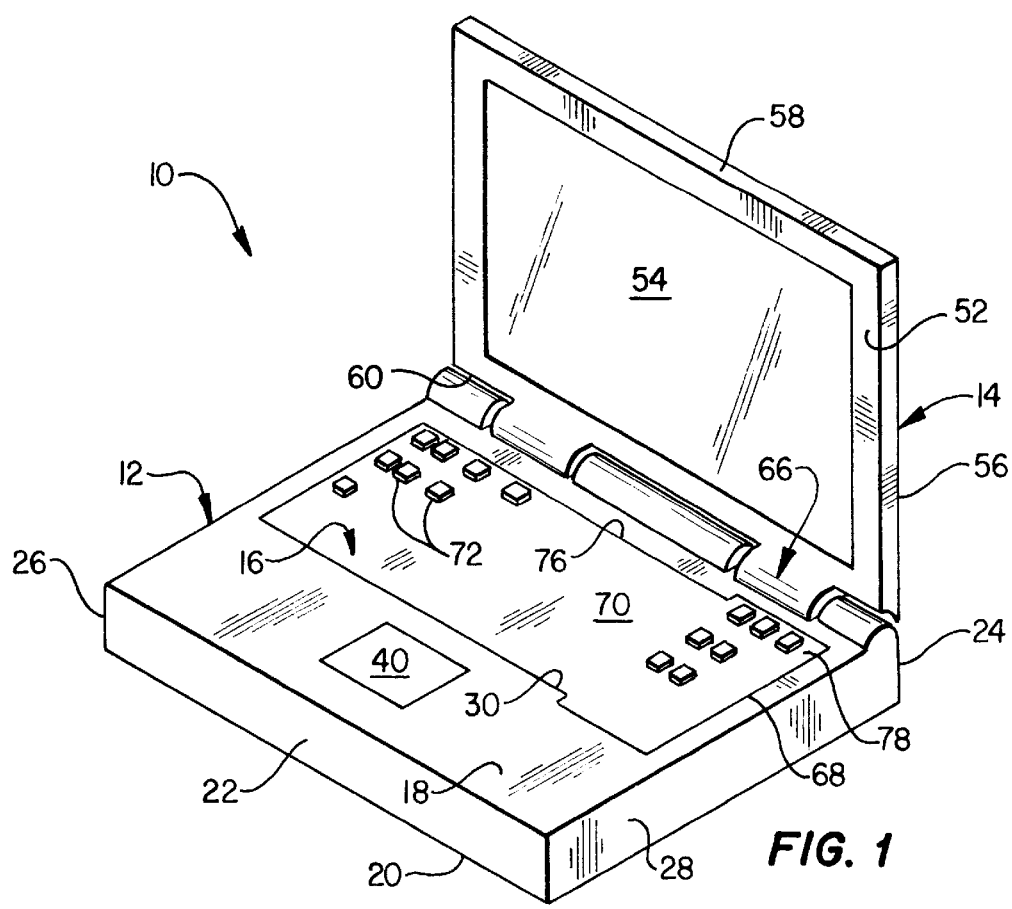
FIG. 1 is a simplified perspective view of a representative opened portable notebook computer having incorporated therein a specially designed removable and vertically supportable keyboard assembly embodying principles of the present invention.
Figure 2:
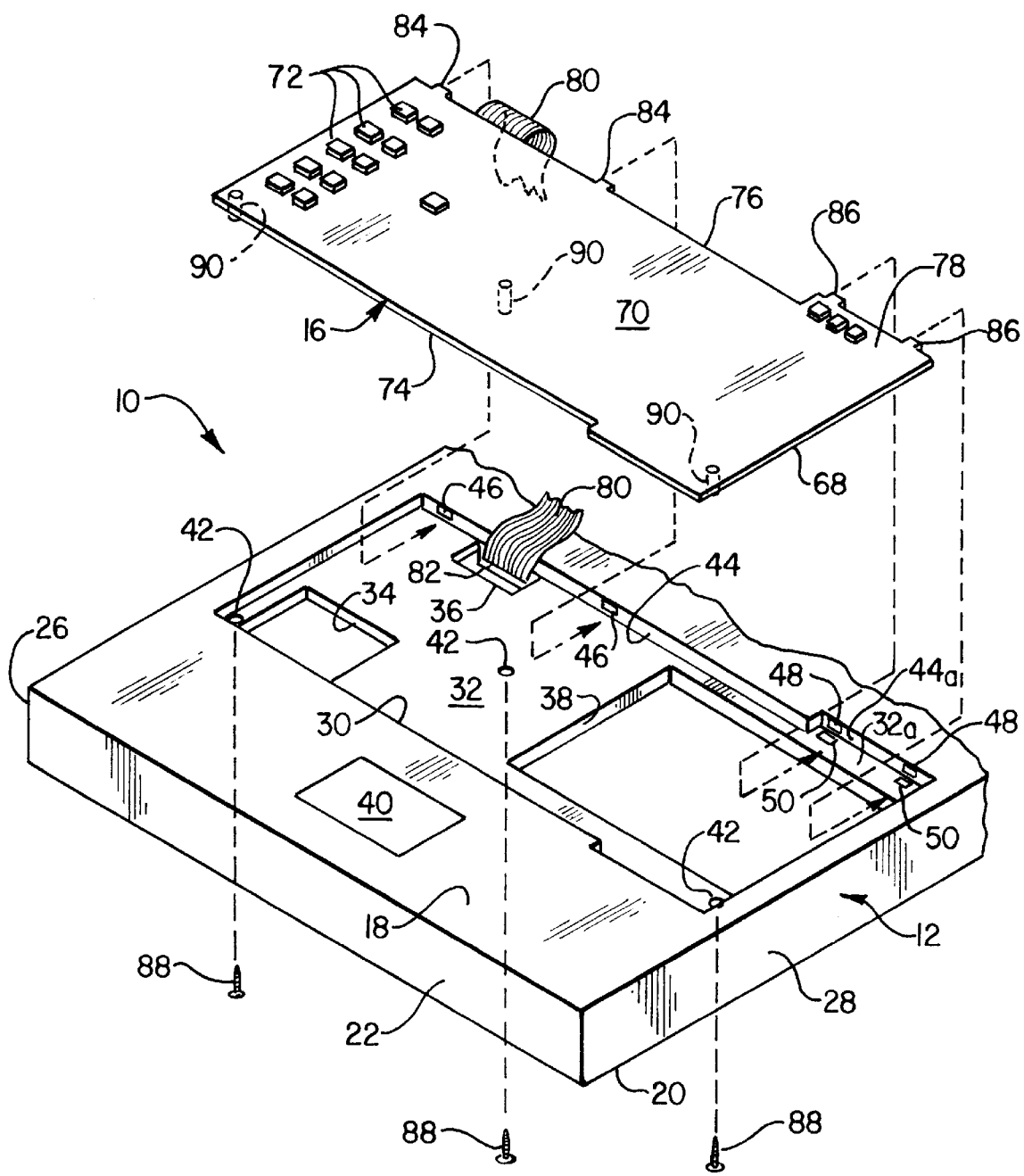
FIG. 2 is an enlarged scale, partially exploded perspective view of a base housing portion of the computer.

Perspectively illustrated in FIGS. 1 and 2 is a portable notebook computer 10 embodying principles of the present invention. Computer 10 includes a generally rectangular base housing 12, a generally rectangular lid or display housing 14, and a specially designed removable keyboard assembly 16.

Base housing 12 has top and bottom side walls 18 and 20, front and rear side walls 22 and 24, and left and right end walls 26 and 28. For purposes later described, the top side wall 18 has a generally rectangular recess 30 formed therein and having a bottom side 32 in which various base housing interior access openings 34,36,38 are formed. Representatively, recess 30 is offset toward the rear side wall 24 of the base housing 12 and is positioned rearwardly of a pointing device, such as the illustrated touchpad 40, operatively mounted on the top side wall 18.

Figure 3:
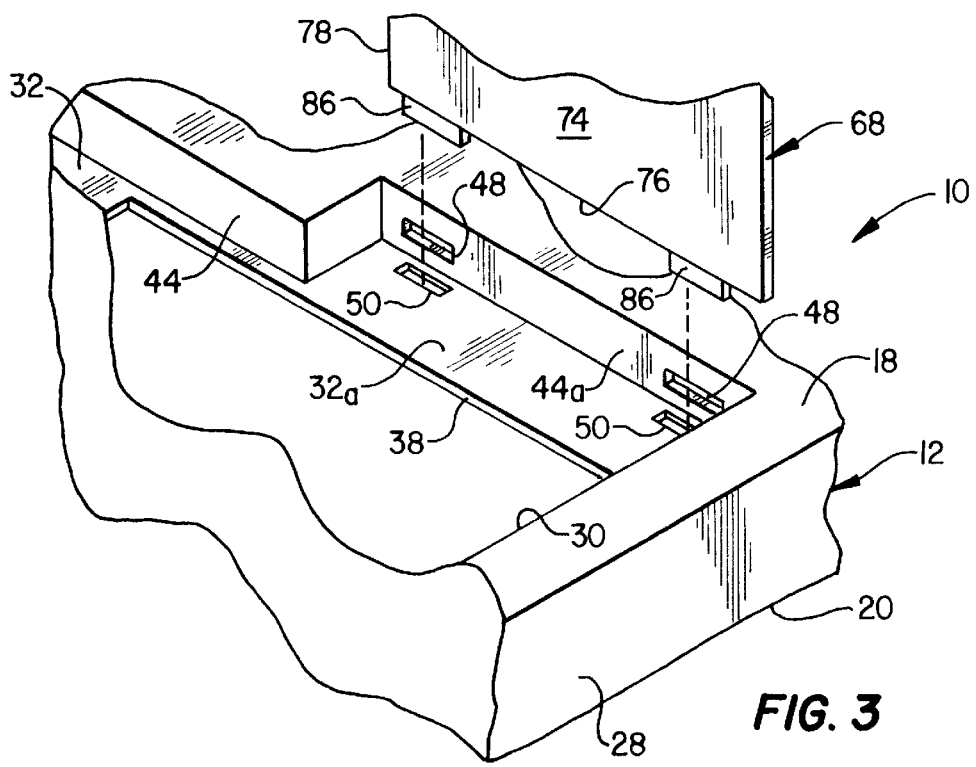
FIG. 3 is an enlarged scale perspective view of a portion of the base housing illustrating the manner in which the removed keyboard assembly may be vertically supported thereon to permit base housing access through its top side.

Circular keyboard connection openings 42 extend upwardly from the bottom side of the base housing 12 through the bottom side wall portion 32 of the recess 30. As illustrated in FIGS. 2 and 3, the recess 30 has a rear vertical side edge surface 44 with a rearwardly offset portion 44a in a right rear corner portion of the recess 30.

For purposes later described herein, a left end portion of the surface 44 has a spaced pair of slots 46 extending rearwardly therethrough, and the rearwardly offset surface portion 44a (see FIG. 3) has a spaced pair of slots 48 extending rearwardly therethrough. Horizontally aligned with the slots 48 are a pair of vertically extending slots 50 formed in the adjacent portion 32a of the bottom side wall portion 32 of the top side wall recess 30.

Figure 4:
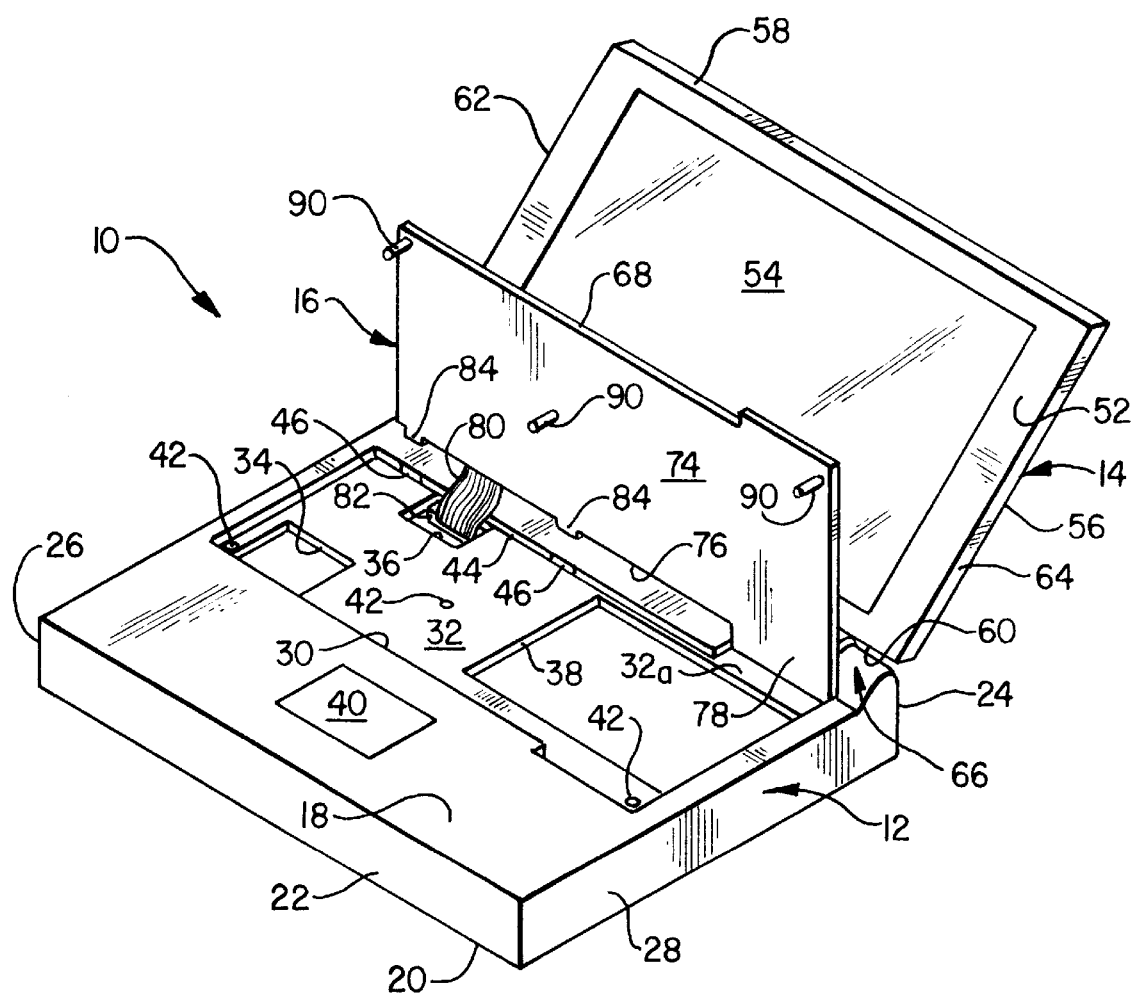
FIG. 4 is a simplified perspective view of the opened computer with the removed keyboard assembly operatively supported in a vertical orientation on the top side of the base housing.

The lid or display housing 14 is of a generally rectangular configuration, is somewhat thinner than the base housing 12, and has an inner side 52 on which a display screen 54 is mounted, an outer or back side 56, front and rear side edges 58 and 60, and left and right end edges 62 and 64. Adjacent rear edge portions of the base and lid housings 12,14 are interconnected with a hinge structure 66 which permits the lid housing 14 to pivot between a closed orientation (not shown) in which the lid housing 14 extends across and covers the base housing top side 18, and various upwardly tilted opened orientations as shown in FIGS. 1 and 4. Suitable latch means (not shown) are provided for releasably retaining the lid housing 14 in its closed position.

Keyboard assembly 16 includes a generally plate-shaped, substantially rectangular support structure 68 having a top side 70 on which a series of keys 72 are operatively mounted, a bottom side 74, a rear side edge 76, and a rearwardly projecting right rear corner portion 78. The support structure 68 is shaped to be complementarily received in the base housing top side wall recess 30 to place the keyboard assembly 16 in the horizontal operating orientation shown in FIG. 1. As illustrated in FIGS. 2 and 4, the keyboard assembly 16 is operatively coupled to the appropriate electronic circuitry within the base housing 12 by means of a flexible ribbon cable 80 interconnected between the keyboard assembly 16 and an electrical connector 82 in the base housing 12.

As illustrated in FIGS. 2–4, a horizontally spaced pair of tabs 84 project rearwardly from a left end portion of the rear side edge 76 of the support structure, and a horizontally spaced pair of tabs 86 project rearwardly from the portion of the rear side edge 76 extending along the rear corner portion 78 of the support structure. To removably install the support structure 68 within the base housing top side recess 30, thus placing the keyboard assembly 16 in its horizontal operating orientation, the support structure 68 is positioned somewhat above the recess 30 in a slightly rearwardly and downwardly tilted orientation, the rear side edge tabs 84,86 on the support structure are respectively inserted into the horizontal base housing slots 46 and 48, and the support structure is forwardly and downwardly tilted into the recess 30.

Support structure 68 is then removably retained in the recess 30 by three screws 88 (see FIG. 2) which are extended upwardly through the bottom of the base housing 12, passed upwardly through the keyboard connection openings 42, and threaded into depending bosses 90 (see FIGS. 2 and 4) on the bottom side 74 of the support structure 68.

To subsequently remove the keyboard assembly 16 from the base housing top side recess 30, and provide base housing access via its then exposed top side area previously occupied by the keyboard assembly 16, the screws 88 are removed, a front side edge portion of the plate-like support structure 68 is upwardly tilted, and the support structure 68 is moved slightly forwardly to remove its rear side edge tabs 84,86 respectively from the horizontal base housing slots 46,48.

Then, according to a key feature of the present invention, with the lid housing 14 opened as shown in FIG. 4 the keyboard assembly 16 may be releasably held in a generally vertical housing access orientation on a back top side portion of the base housing 12 by simply placing the removed keyboard assembly in a vertical orientation with the support structure corner tabs 86 over the vertical base housing slots 50 as shown in FIG. 3, and then lowering the generally vertical keyboard assembly 16 until the support structure corner tabs 86 enter the vertically extending base housing slots 50 and the other support structure tabs 84 (see FIG. 4) rest on a rear portion of the top side of the base housing 12 somewhat forwardly of the raised lid housing 14.

Being able to support the removed keyboard assembly 16 in this vertical orientation on the base housing 12 to permit base housing access through the top side portion thereof previously covered by the keyboard assembly 16 provides several advantages over conventionally constructed removable keyboard assemblies. For example, by being able to vertically support the keyboard assembly 16 on the base housing 12 during access thereto, the keyboard assembly cannot become separated from the balance of the computer and lost. Additionally, the removed keyboard assembly does not have to be placed on a work surface area to one side of the computer where the keyboard assembly can be damaged by other equipment or be knocked off onto the floor.

Moreover, as can be readily be seen in FIG. 4, the removal of the keyboard assembly 16 from its base housing top side recess 30 and placement in the illustrated vertical access orientation does not require that the interconnection cable 80 be removed from either the keyboard assembly 16 or the base housing electrical connector 82. Also, although the removed keyboard assembly 16 is held in a generally vertical orientation on the top side of the base housing 12 it is not necessary that the keyboard assembly be leaned up against the opened lid housing 14 to be supported in this orientation. Accordingly, the vertically supported keyboard assembly 16 does not engage and potentially scratch the display screen 54.

The specially designed support structure portion 68 of the keyboard assembly 16, with its tabs 84 and 86, and the associated base housing slots 46,48,50 are quite simple to fabricate, and do not appreciably add to the overall cost of the computer 10. And, as just described, due to these interlocking tab and slot means, the keyboard assembly 16 may be quite easily and quickly be moved between its operating and access orientations.

The foregoing detailed description is to be clearly understood as being given by way of illustration and example only, the spirit and scope of the present invention being limited solely by the appended claims.

What is claimed is:

1. A personal computer, comprising:

a base housing;

a display connected to the base housing by a hinge;

a keyboard assembly; and an interlock system coupled to the base housing and the keyboard assembly, wherein the interlock system maintains the keyboard assembly at a plurality of selected angular positions.

2. The personal computer as recited in claim 1, wherein the interlock system comprises a plurality of interlocking tabs and slots.

3. The personal computer as recited in claim 2, wherein the tabs and slots are positioned to lock the keyboard at one of the plurality of selected angular positions.

4. The personal computer as recited in claim 3, wherein the tabs are disposed on the keyboard assembly and the slots are disposed in the base housing.

5. The personal computer as recited in claim 1, wherein the keyboard assembly is disposed in a portable computer.

6. The personal computer as recited in claim 1, wherein the keyboard assembly is disposed in a notebook computer.

7. The personal computer as recited in claim 1, further comprising a conductive cable that maintains an electrical connection between an electrical connection device mounted in the housing and the keyboard at each of the plurality of selected angular positions.

8. A portable computer, comprising:

a base having a recess;

a keyboard sized to fit within the recess;

an electrical connector disposed to electrically couple the base to the keyboard; and an interlock system designed to hold the keyboard against pivotal motion at an angular position, the angular position permitting access to the recess otherwise containing the keyboard.

9. The portable as recited in claim 8, further comprising a display connected to the base by a hinge.

10. The personal computer as recited in claim 9, wherein the interlock system comprises a plurality of interlocking tabs and slots.

11. The personal computer as recited in claim 10, wherein the tabs and slots are positioned to lock the keyboard at one of a plurality of selected angular positions.

12. The personal computer as recited in claim 11, wherein the tabs are disposed on the keyboard and the slots are disposed in the base.

13. The personal computer as recited in claim 8, wherein the keyboard is disposed in a portable computer.

14. The personal computer as recited in claim 8, wherein the keyboard is disposed in a notebook computer.

15. The personal computer as recited in claim 8, wherein the electrical connector comprises a flexible cable.

16. A personal computer, comprising:

a base;

a display connected to the base by a hinge;

a keyboard assembly; and an interlock system comprising a plurality of tabs and a plurality of corresponding slots that permit the keyboard assembly to be locked at one of a plurality of selected angular positions.

17. The personal computer as recited in claim 16, wherein the tabs are disposed on the keyboard assembly and the slots are disposed in the base.

18. The personal computer as recited in claim 16, wherein the keyboard assembly is disposed in a portable computer.

19. The personal computer as recited in claim 16, wherein the keyboard assembly is disposed in a notebook computer.

20. The personal computer as recited in claim 16, further comprising a conductive cable that maintains an electrical connection between an electrical connector device mounted in the housing and the keyboard during each of the plurality of selected angular positions.

\* \* \* \* \*